(12) United States Patent
Kobayashi et al.

(10) Patent No.: US 6,988,974 B2
(45) Date of Patent: Jan. 24, 2006

(54) CONTROL DEVICE FOR VEHICLES

(75) Inventors: Yasuhiko Kobayashi, Anjo (JP); Yukinori Nakamori, Anjo (JP); Shigeki Takami, Anjo (JP); Atsushi Kayukawa, Anjo (JP); Yoichi Tajima, Anjo (JP); Yoshitaka Murase, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 135 days.

(21) Appl. No.: 10/737,824

(22) Filed: Dec. 18, 2003

(65) Prior Publication Data
    US 2004/0134697 A1    Jul. 15, 2004

(30) Foreign Application Priority Data
    Dec. 27, 2002 (JP) .............................. 2002-382587

(51) Int. Cl.
    *B60K 1/02*    (2006.01)

(52) U.S. Cl. .............................................. 477/3; 477/7
(58) Field of Classification Search .................... 477/2, 477/3, 7; 180/65.1–65.8
    See application file for complete search history.

(56) References Cited

U.S. PATENT DOCUMENTS

| 6,090,007 A  | * | 7/2000  | Nakajima et al. ............. 477/46 |
| 6,247,437 B1 |   | 6/2001  | Yamaguchi et al.                     |
| 6,637,530 B1 | * | 10/2003 | Endo et al. ................. 180/65.2 |
| 6,655,485 B1 | * | 12/2003 | Ito et al. ..................... 180/65.6 |

FOREIGN PATENT DOCUMENTS

| JP | A 9-215270   |   | 8/1997 |
| JP | A 11-153075  |   | 6/1999 |
| JP | 2004-229371  | * | 8/2004 |

* cited by examiner

*Primary Examiner*—Ha Ho
(74) *Attorney, Agent, or Firm*—Oliff & Berridge, PLC

(57) ABSTRACT

A control device for a vehicle including a motor, an engine, wherein the motor can be drivingly connected with the engine, a torque converter, a transmission mechanism for transmitting the drive torque, which is transmitted via the torque converter from the engine and the motor, to drive wheels, and a controller that controls a driving state of the motor, controls a driving state of the engine, and outputs a torque reduction command for controlling a drive torque of the motor in order to place the drive torque of the motor within a maximum input torque of the transmission mechanism, wherein the maximum input torque is calculated based on a torque ratio of the torque converter when the engine begins driving after the motor begins driving.

20 Claims, 9 Drawing Sheets

|  | C-1 | C-2 | C-3 | B-1 | B-2 | B-3 | B-4 | B-5 | F-1 | F-2 |
|---|---|---|---|---|---|---|---|---|---|---|
| N |  |  |  |  |  |  |  | ○ |  |  |
| 1st | ○ |  |  |  |  | △ |  | ○ |  | ○ |
| 2nd | ○ |  |  | △ | ○ |  |  | ○ | ○ |  |
| 3rd | ○ |  |  | △ | ○ |  | ○ |  | ○ |  |
| 4th | ○ |  | ○ | △ | ○ |  |  |  | ○ |  |
| 5th | ○ | ○ | ○ |  |  |  |  |  |  |  |
| REV |  | ○ |  |  |  | ○ |  | ○ |  |  |

| THROTTLE OPENING DEGREE [%] | 0 | 5 | 10 | 20 | 40 | 50 | 60 | 70 | 80 | 100 |
|---|---|---|---|---|---|---|---|---|---|---|
| TARGET ROTATING SPEED [rpm] | 650 | 950 | 1200 | 1150 | 1150 | 1150 | 1150 | 1150 | 1150 | 1150 |

Fig. 5

CONTROL DEVICE FOR VEHICLES

The disclosure of Japanese Patent Application No. 2002-382587 filed on Dec. 27, 2002, including the specification, drawings and abstract are incorporated herein by reference in their entirety.

BACKGROUND OF THE INVENTION

1. Field of Invention

The invention relates to a control device for a vehicle.

2. Description of Related Art

There exists parallel hybrid systems in which both an engine and a motor/generator are attached to a transmission. Drive forces from both the engine and the motor/generator are transmitted to the transmission at the time of departure and acceleration, the motor/generator functions as a generator when a vehicle runs on a downhill road and when the vehicle brakes to make up for the engine brake effect, and a braking energy is recovered to enhance fuel consumption and to reduce a discharge of exhaust gas (see, for example, JP-A-9-215270).

In a vehicle with the hybrid system (HEV: Hybrid Electric Vehicle), there exists a starting control device for an internal combustion engine (see, for example, JP-A-11-153075). The starting control device restricts a maximum torque of the internal combustion engine at a vehicle departure time during a cold condition in order to reduce power consumption. The starting control restricts the maximum torque because when a motor is used to crank the internal combustion engine for starting in a cold condition in which the engine temperature is low, an engine speed is not readily increased due to a high viscosity of a lubricating oil. The battery is thus wastefully consumed until a predetermined engine speed is reached.

Incidentally, vehicles constructed such that the internal combustion engine is started by motor torque possibly suffer from a disadvantage in that a surplus torque is generated at the start of an engine that succeeds the driving of the motor. The surplus torque causes wheelspin and damage on a transmission. In particular, with such an arrangement, in which a torque converter is provided between the motor and the internal combustion engine and the transmission, a torque increasing action of the torque converter is high at the time of departure in a low speed. As such, a surplus torque is liable to be transmitted to a side of drive wheels via the transmission from the torque converter when the engine starts driving after the motor starts driving in order to add an engine torque to a motor torque.

SUMMARY OF THE INVENTION

The invention thus provides a control device for a vehicle that is constructed to suppress a surplus torque which is liable to be generated through a torque converter at the time of output of an engine torque after an output of a motor torque in order to prevent the generation of wheelspin or the like.

The invention according to a first exemplary aspect of the invention includes a control device for a vehicle with a motor, an engine, wherein the motor can be drivingly connected with the engine, a torque converter, a transmission mechanism for transmitting the drive torque, which is transmitted via the torque converter from the engine and the motor, to drive wheels, and a controller. The controller controls a driving state of the motor, controls a driving state of the engine, and outputs a torque reduction command for controlling a drive torque of the motor in order to place the drive torque of the motor within a maximum input torque of the transmission mechanism, wherein the maximum input torque is calculated based on a torque ratio of the torque converter when the engine begins driving after the motor begins driving.

In addition, "motor" in the invention is a concept that is not limited to a so-called motor in a narrow sense for the conversion of electric energy into rotational movement but includes a so-called generator for conversion of rotational movement into electric energy.

According to the first exemplary aspect of the invention, the controller controls a drive torque of a motor in a manner to set the drive torque of the motor within a range of a maximum input torque of a transmission calculated on the basis of a torque ratio of the torque converter when the driving of the engine is started after the driving of the motor is started. With, for example, an automatic transmission, it is thus possible to eliminate shocks created by frictional engagement elements that slide and then abruptly engage with one another.

BRIEF DESCRIPTION OF THE DRAWINGS

Various embodiments of the invention will be described with reference to the drawings, wherein:

FIG. 5 is a view showing table data used in calculating a target rotational speed;

DETAILED DESCRIPTION OF PREFERRED EMBODIMENTS

Figure 2:
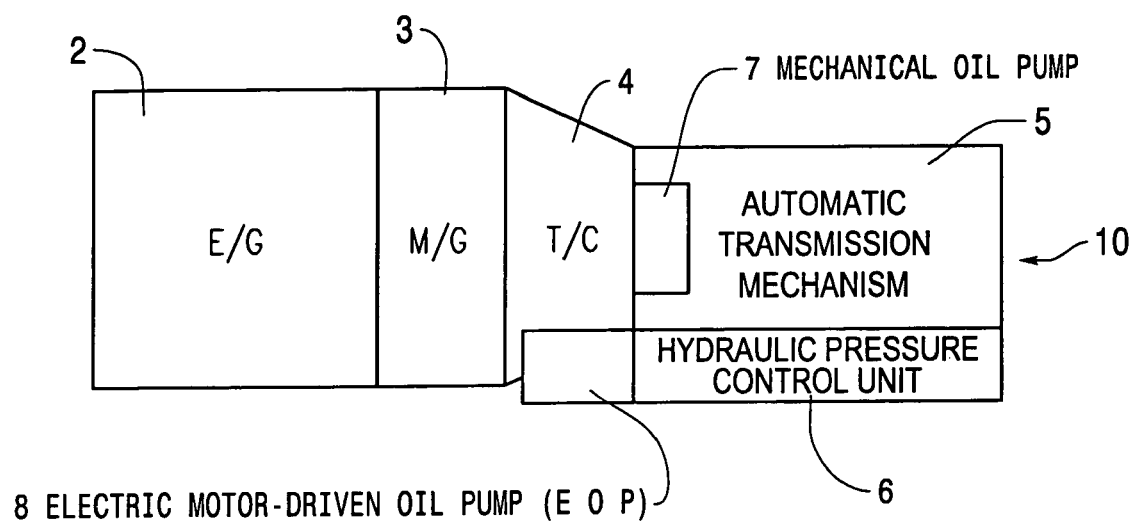
FIG. 2 is a schematic block diagram showing a drive system of a hybrid vehicle to which the control device according to the invention is applicable.
Figures 3A, 3B:
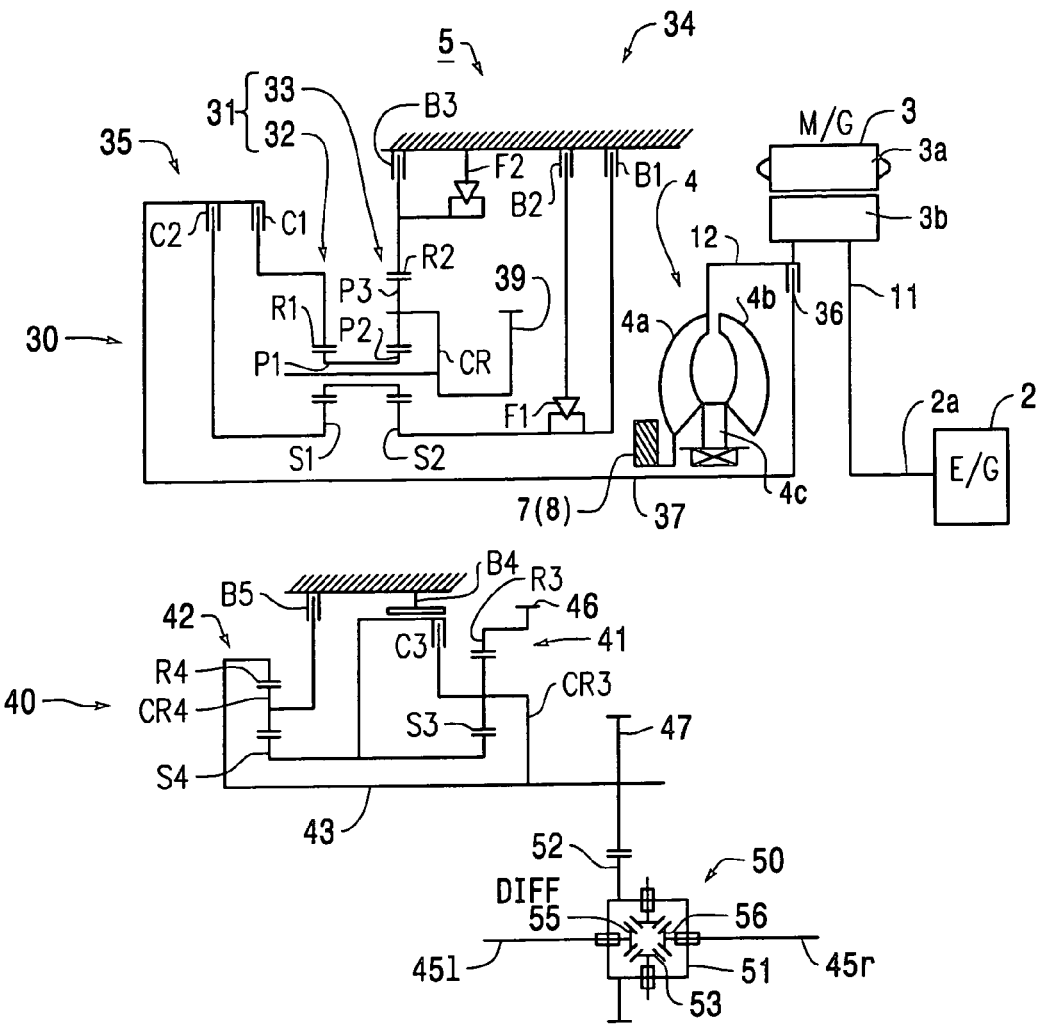
FIGS. 3A and 3B are views showing details of an automatic transmission mechanism to which the invention is applicable, FIG. 3A being a skeleton view of the automatic transmission mechanism and FIG. 3B being a working table thereof.

A first embodiment of the invention will be described below with reference to the drawings. First, referring to FIGS. 2 and 3, an explanation will be given to a drive system of a hybrid vehicle, and an automatic transmission mechanism provided therein, to which a control device according to the invention is applicable. FIG. 2 is a schematic block diagram showing a drive system of a hybrid vehicle, and FIG. 3 is a view showing details of an automatic transmission mechanism 5, to which the invention is applicable. FIG. 3A being a skeleton view of the automatic transmission mechanism 5, and FIG. 3B being a working table thereof. In addition, engine drive start in the embodiment means that an engine is started and begins to output a positive torque.

As shown in FIG. 2, a drive source is composed of an internal combustion engine (E/G) (referred simply below to as "engine") 2 and a motor/generator (M/G) (referred simply below to as "motor") 3, and the drive force is output to an automatic transmission 10. The automatic transmission 10 comprises a torque converter (T/C) 4, the automatic transmission mechanism 5, a hydraulic control 6, a mechanical oil pump 7, and an electrically-driven oil pump 8, which is one example of a fluid transmission apparatus.

The automatic transmission mechanism 5 varies a input drive force on the basis of a predetermined vehicle running condition in order to output the same to drive wheels or the like. Also, the automatic transmission mechanism 5 comprises a plurality of frictional engagement elements (clutch, brake) for achieving a shift, and the hydraulic control 6 hydraulically controls engagement of the frictional engagement elements to vary the same in speed and to control actuation of the torque converter 4. Also, the mechanical oil pump 7 and the electrically-driven oil pump 8 feed hydraulic pressure to the hydraulic control 6. The mechanical oil pump 7 is configured to interlock with the torque converter 4 and is driven by the engine 2 and the motor 3. The electrically-driven oil pump 8 is independent of of the engine 2 and the motor 3 and is driven by a motor (not shown), to which power is supplied from a battery (not shown).

The automatic transmission mechanism 5 comprises, as shown in FIG. 3A, a main automatic transmission 30, a sub-transmission 40, and a differential 50. The main automatic transmission 30 is arranged on a first shaft (referred below to as "input shaft") 37 aligned with an engine output shaft, and drive forces are transmitted to the input shaft 37 through the torque converter 4 from the engine 2 and the motor 3. Arranged on the input shaft 37 are the mechanical oil pump 7, the electrically-driven oil pump 8, both of which are disposed adjacent to the torque converter 4, a brake unit 34, a planetary gear unit 31, and a clutch unit 35 in this order.

The motor 3 comprises a stator 3a and a rotor 3b for rotation relative to the stator 3a, and a crankshaft 2a of the engine 2 is coupled to a center of rotation of a drive plate 11 provided on an inner peripheral side of the rotor 3b. Also, the torque converter 4 comprises a stator 4c, of which rotation only in one direction is allowed through a lockup clutch 36, a pump impeller 4a, a turbine runner 4b, and a one-way clutch 4d, and a front cover 12 is arranged to cover them.

The planetary gear unit 31 comprises a simple planetary gear 32 and a double-pinion planetary gear 33. The simple planetary gear 32 comprises a sun gear S1, a ring gear R1, and a carrier CR supporting a pinion P1 meshing with these gears. The double-pinion planetary gear 33 comprises a sun gear S2, a ring gear R2, and the carrier CR supporting a pinion P2, which meshes with the sun gear S1, and a pinion P3, which meshes with the ring gear R2, in a manner to have these pinions meshing with each other. And the sun gear S1 and the sun gear S2, respectively, are rotatably supported on a hollow shaft rotatably supported on the input shaft 37. Also, the carrier CR is common to the both planetary gears 32, 33, and the pinions P1, P2, respectively, meshing with the sun gears S1, S2 are coupled to each other in a manner to rotate together.

The brake unit 34 comprises a one-way clutch F1, a brake B1, and a brake B2, which are arranged successively radially outward from an inside diameter side, and a counter drive gear 39 is coupled to the carrier CR through a spline. Further, a one-way clutch F2 is provided on the ring gear R2, and a brake B3 is interposed between an outer periphery of the ring gear R2 and a casing. Also, the clutch unit 35 comprises a forward clutch (referred simply below to as "clutch") C1 being an input clutch (frictional engagement element) and a direct clutch C2. The clutch C1 being provided on an outer periphery of the ring gear R1, and the direct clutch C2 being interposed between an inner periphery of a movable member (not shown) and a flange connected to a tip end of the hollow shaft.

The sub-transmission 40 is provided on a second shaft 43 arranged in parallel to the input shaft 37, and the input shaft 37 and the second shaft 43 together with a third shaft, which is composed of differential shafts (left and right axles) 45l, 45r, are configured to be triangular-shaped as viewed from a side. And the sub-transmission 40 comprises simple, planetary gears 41, 42, a carrier CR3 and a ring gear R4 connected together, and sun gears S3, S4 connected together, whereby a Simpson type gear train is constituted. Further, a ring gear R3 is connected to a counter driven gear 46 to constitute an input section, and also to a reduction gear 47, an output section of which is constituted by the carrier CR3 and the ring gear R4. Further, a UD direct clutch C3 is interposed between the ring gear R3 and the integral sun gears S3, S4, the integral sun gear S3 (S4) can be appropriately latched by a brake B4, and a carrier CR4 can be appropriately latched by a brake B5. Thereby, the sub-transmission 40 can obtain three forward speed gear changes.

Also, the differential 50 constituting the third shaft comprises a differential case 51, to which a gear 52 meshing with the reduction gear 47 is fixed. Further, a differential gear 53 and left and right side gears 55, 56 mesh with each other and are rotatably supported within the differential case 5 1, and the left and right axles 45l, 45r are extended from the left and right side gears. Thereby, rotation of the gear 52 branches according to load torques to be transmitted to left and right front wheels via the left and right axles 45l, 45r.

Provided on the clutches C1, C2 and the brakes B1, B2, B3, B4, B5, respectively, are hydraulic servos (not shown), the driving of which is controlled when being supplied with hydraulic pressure controlled by the hydraulic control 6, the hydraulic servos comprising pistons for pressing a plurality of inner friction plates and outer friction plates arranged with gaps in the clutches and the brakes, and being configured to be able to optionally operate conditions of engagement in the clutches and the brakes.

Subsequently, an operation of the automatic transmission mechanism 5 will be described in line with the working table shown in FIG. 3B. In a first-speed (1ST) state in forward travel, the clutch C1, the one-way clutch F2, and the brake B5 engage together. Thereby, the main automatic transmission 30 is put in the 1ST state, and its decelerating rotation is transmitted to the ring gear R3 of the sub-transmission 40 via the counter drive gears 39, 46. The sub-transmission 40 is in the 1ST state with the carrier CR4 stopped by the brake B5. The decelerating rotation of the main automatic transmission 30 is further reduced by the sub-transmission 40 to be transmitted to the axles 45l, 45r via the gears 47, 52 and the differential 50.

In a second-speed (2ND) state in forward travel, the brake B2 as well as the clutch C1 engages, and the one-way clutch F2 smoothly switches over to the one-way clutch F1 to put the main automatic transmission 30 in the 2ND state. Also, the sub-transmission 40 is in the 1ST state owing to engagement of the brake B5, and the 2ND state and the 1ST state combine, so that the whole automatic transmission mechanism 5 provides 2ND rotation.

In a third-speed (3RD) state in forward travel, the main automatic transmission 30 is in the same state as the 2ND state, in which the clutch C1, the brake B2, and the one-way clutch F1 engage together, and the sub-transmission 40 causes engagement of the brake B4. Then, the sun gears S3, S4 are made stationary, rotation from the ring gear R3 is output as 2ND rotation from the carrier CR3, and accordingly the 2ND state of the main automatic transmission 30 and the 2ND state of the sub-transmission 40 combine, so that the whole automatic transmission mechanism 5 effects 3RD rotation.

In a fourth-speed (4TH) state in forward travel, the main automatic transmission 30 is in the same state as the 2ND and 3Rd states, in which the clutch C1, the brake B2, and the one-way clutch F1 engage together, and the sub-transmission 40 causes engagement of the UD direct clutch C3 as well as release of the brake B4. In this state, the ring gear R3 and the sun gear S3 (S4) couple together, so that both of the planetary gears 41, 42 rotate together directly. Accordingly, the 2ND state of the main automatic transmission 30 and direct rotation (3RD) of the sub-transmission 40 combine, so that the whole automatic transmission mechanism 5 provides 4TH rotation.

In a fifth-speed (5TH) state in forward travel, the clutch C1 and the direct clutch C2 engage together, so that rotation of the input shaft 37 is transmitted to both the ring gear R1 and the sun gear S1, and the main automatic transmission 30 effects direct rotation, in which the planetary gear unit 31 is rotated together. Also, the sub-transmission 40 effects direct rotation with the UD direct clutch C3 engaged, and accordingly, the 3RD state (direct) of the main automatic transmission 30 and the 3RD state (direct) of the sub-transmission 40 combine, so that the whole automatic transmission mechanism 5 effects 5TH rotation.

In a state of reverse travel (REV), the direct clutch C2 and the brake B3 engage together, and the brake B5 engages. In this state, reverse rotation is taken out from the main automatic transmission 30 and the carrier CR4 is stopped in a direction of reverse rotation on the bases of the brake B5, so that the sub-transmission 40 is held in the 1ST state. Accordingly, reverse rotation of the main automatic transmission 30 and rotation of the sub-transmission 40 combine together to provide for reverse decelerating rotation.

In addition, in FIG. 3B, a mark O indicates a state of engagement, and a triangle mark indicates actuation at the time of braking. That is, in the 1ST state in forward travel, the brake B3 engages to fix the ring gear R2 in place of the one-way clutch F2. In the 2ND, 3RD and 4TH in forward travel, the brake B1 engages to fix the sun gear S2 in place of the one-way clutch F1.

Figure 1:
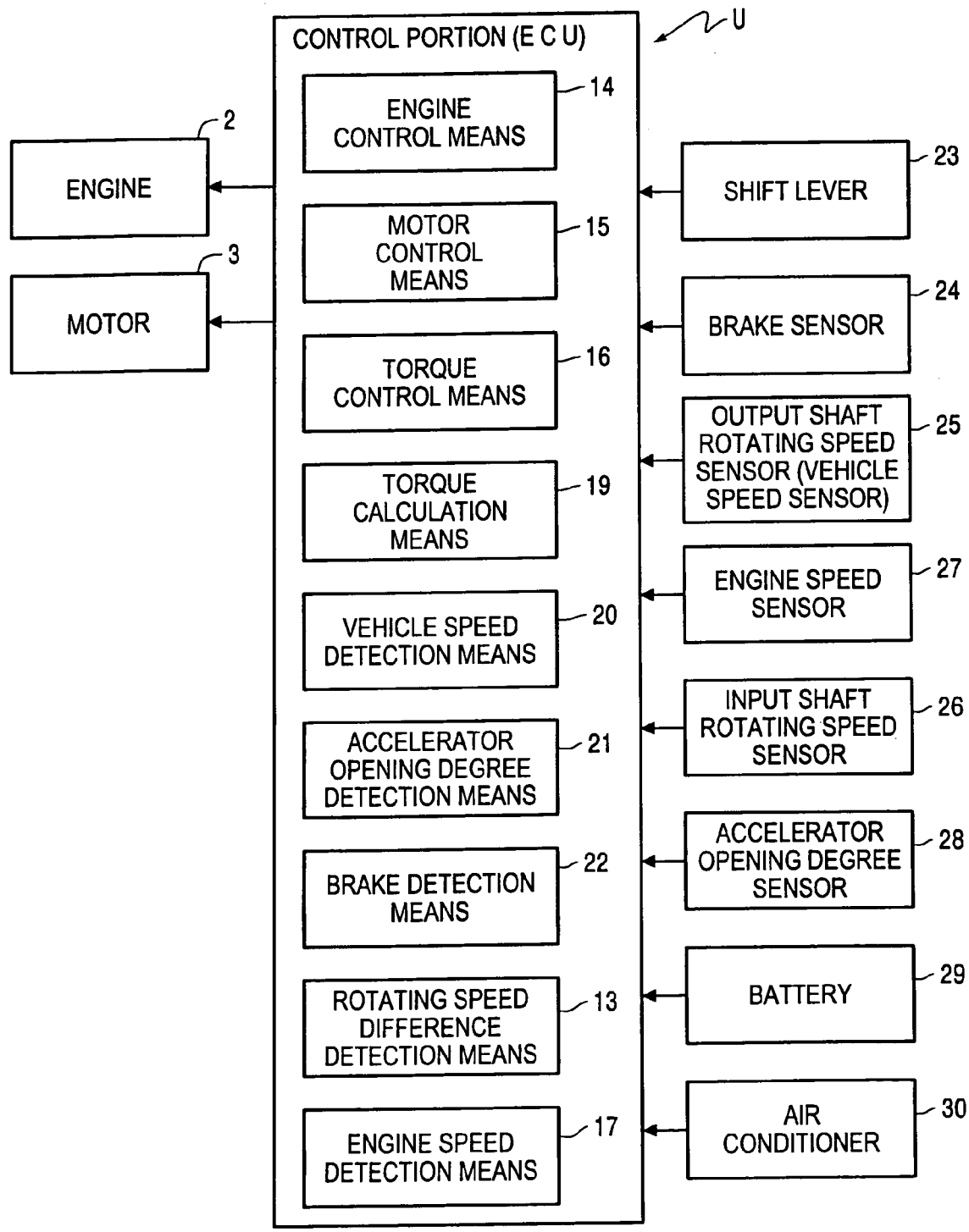
FIG. 1 is a block diagram showing a control device for vehicles according to an embodiment of the invention.

Subsequently, an explanation will be given to a control device for vehicles, according to the invention with reference to FIG. 1. FIG. 1 is a block diagram showing a control device for vehicles, according to an embodiment of the invention. As shown in FIG. 1, the control device comprises a control unit (ECU) U, to which the engine (E/G) 2 and the motor/generator (M/G) 3 (see FIG. 2), respectively, are connected. Also, connected to the control unit U are a shift lever 23 arranged on, for example, a driver's seat, a brake sensor 24 provided on a brake pedal (vehicle brake), an output shaft rotating speed sensor (vehicle speed sensor) 25 provided on the axles 45l, 45r, which serve as output shafts of the automatic transmission 10, an engine speed sensor 27 provided on the crankshaft (output shaft) 2a of the engine 2, an input shaft rotating speed sensor 26 provided on the input shaft 37, an accelerator opening degree sensor 28 for detecting an accelerator opening degree on a side of the engine 2, a battery 29, an air conditioner (inboard) 30, and so on.

The control unit U also comprises engine control means 14, motor control means 15, torque control means 16, torque calculation means 19, vehicle speed detection means 20, accelerator opening degree detection means 21, brake detection means 22, rotating speed difference detection means 13, and engine speed detection means 17.

The engine control means 14 executes various controls for engine driving, such as a stop control of the engine 2 based on the speed detected by the vehicle speed detection means 20, detection results from the output shaft rotating speed sensor 25, a brake operating state detected by the brake detection means 22, and detection results from the brake sensor 24, ignition control of the engine 2, a state of complete explosion of the ignited engine 2. Further, the engine control means 14 has the idling stop control function for switching the engine 2 between a drive state and a stop state according to a predetermined condition. More specifically, the idling stop control function performs control to stop fuel injection in order to stop driving the engine 2 when a vehicle speed 0 [km/h] is detected by the speed detection means 20, and to perform injection in order to start the engine 2 when an accelerator opening degree of at least a predetermined value is detected by the accelerator opening degree detection means 21 and an engine speed of at least a predetermined value is detected on the basis of a detection by the engine speed sensor 27 after a departure is effected by only driving the motor 3.

The motor control means 15 performs running drive control including a start control by the motor 3, stop control, and assist control, generation control for charging the battery 29 with electricity, and regeneration control for reverse-driving the motor/generator 3 to generate a negative torque (regenerative toque). The motor control means 15 timely controls the motor/generator 3 timely on the basis of various conditions such as a vehicle speed detected by the speed detection means 20, an accelerator opening degree detected by the accelerator opening degree detection means 21, or a driver's intention of speed reduction detected by the brake detection means 22, a command from speed change control means (not shown), torque calculation data from the torque calculation means 19, and so on.

Incidentally, when an accelerator pedal is stepped on during a low vehicle speed, in which the axles 45l, 45r which constitute output shafts of the automatic transmission mechanism 5 are relatively low in rotational speed, the pump impeller 4a of the torque converter 4 is rapidly increased in rotational speed according to a stepping-on of the accelerator pedal. However, the turbine runner 4b is gently increased in rotational speed, the torque converter 4 is increased in slippage and the torque increasing action is correspondingly increased. The motor control means 15 performs drive control to reduce a drive torque of the motor 3 a predetermined quantity to cancel a surplus torque based on the torque increasing action of the engine 2 in response to a command of torque reduction forwarded from the torque control means 16.

Even when the engine control means 14 begins driving the engine 2 after the motor control means 15 begins driving the motor 3, and when torque is in a predetermined toque range during a surplus torque due to the torque increasing action by the torque converter 4, the torque control means 16 outputs to the motor control means 15 a torque reduction command to reduce a drive torque of the motor 3 a predetermined quantity to cancel a surplus torque produced by a drive torque of the engine 2. At this time, the torque control means 16 controls the speed of the motor 3 to thereby rapidly enable inhibitory control of the surplus torque, which is liable to generate via the torque converter 4.

When outputting the torque reduction command, the torque control means 16 can calculate a motor torque limit value (TrqLimMt) prescribing a drive torque, which the motor 3 should output in order to cancel the surplus torque. This calculation is based on, for example, a torque limit value (TrqLimOut) allowed to be input into the automatic transmission mechanism 5, a torque ratio (t()) of the torque converter 4, a speed ratio (e: ATRpm/EgRpm) of the crankshaft 2a of the engine 2 and the input shaft 37 of the automatic transmission mechanism 5, and a drive torque (TrqEg) of the engine 2 at the time of calculation of the motor torque limit value.

Receiving a predetermined torque signal, which includes an output torque (drive torque) and an inertia torque from the engine 2, the torque calculation means 19 calculates an output torque of and an inertia torque of the engine 2. After receiving a predetermined torque signal from the motor 3, the torque calculation means 19 also calculates an output torque of and an inertia torque of the motor 3. Also, while speed change control is controlled by speed change means (not shown), the torque calculation means 19 makes, on the basis of engine speed detected by the engine speed detection means 17, a calculation of inertia torques of the crankshaft 2a of the engine 2 and the torque converter 4, and a calculation of the sum of the calculated inertia torques and those output torques (drive torques) and inertia torques of the engine 2 and the motor 3, which are beforehand calculated, to output the same to the engine control means 14, the motor control means 15, and the torque control means 16, respectively.

The speed detection means 20 detects a vehicle speed (vehicle running speed) on the basis of detection results of the output shaft rotating speed sensor 25. Also, the accelerator opening degree detection means 21 detects an opening degree of a throttle provided on a side of the engine 2 on the basis of detection results of the accelerator opening degree sensor 28. The brake detection means 22 detects a state of brake actuation, that is, a braking (ON) state and a non-braking (OFF) state of a service brake (not shown), on the basis of detection results of the brake sensor 24.

The rotating speed difference detection means 13 detects a difference in rotating speed between an engine rotating speed Ne based on detection results of the engine speed sensor 27 and an input shaft rotating speed Ni based on detection results of the input shaft rotating speed sensor 26 to output the same to the torque control means 16 or the like.

The engine speed detection means 17 detects an engine rotating speed on the basis of detection results from the engine speed sensor 27 to output the same to the engine control means 14, the motor control means 15, and the torque control means 16, respectively.

Figure 4:
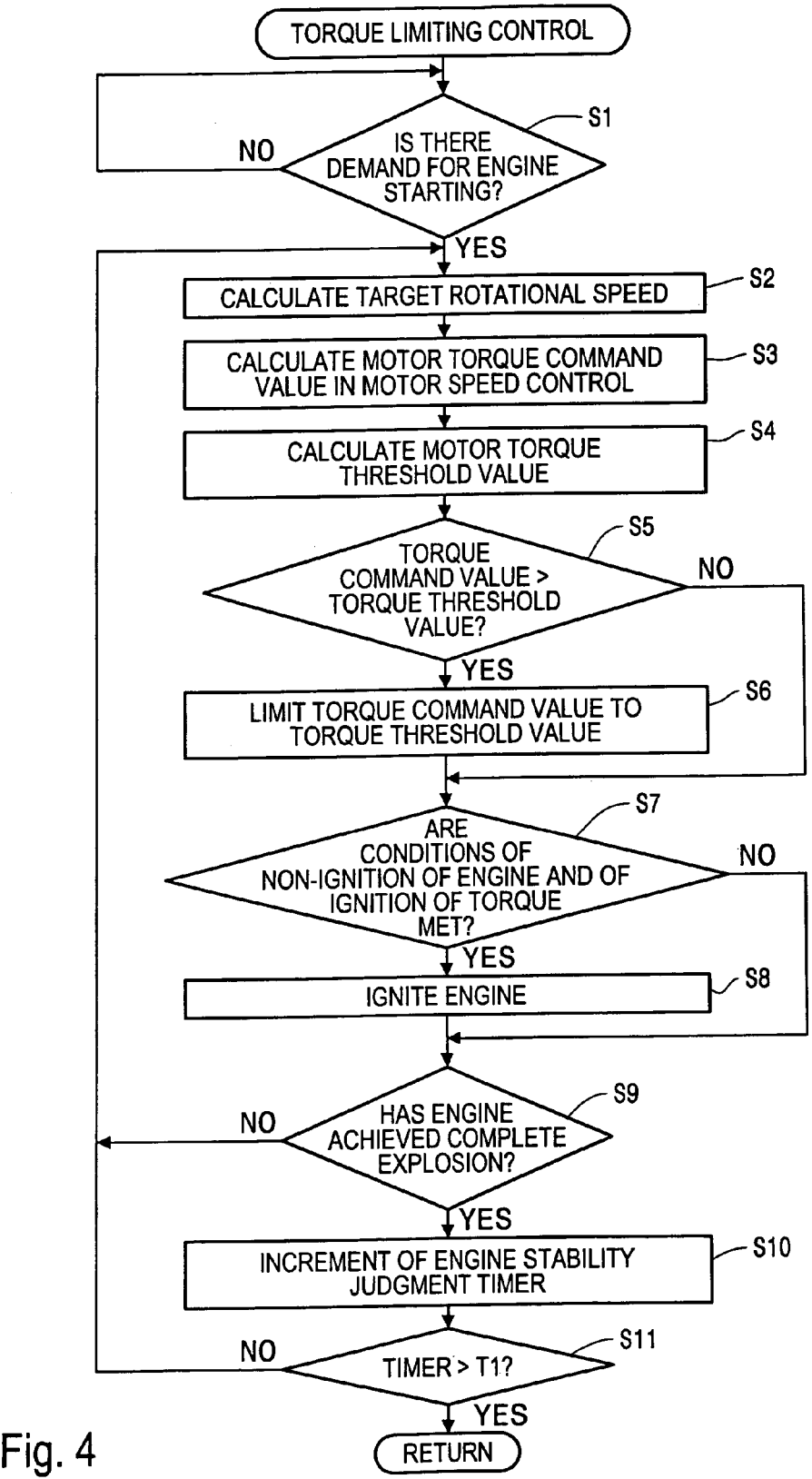
FIG. 4 is a time chart showing an example of torque limiting control in the embodiment.
Figure 6:
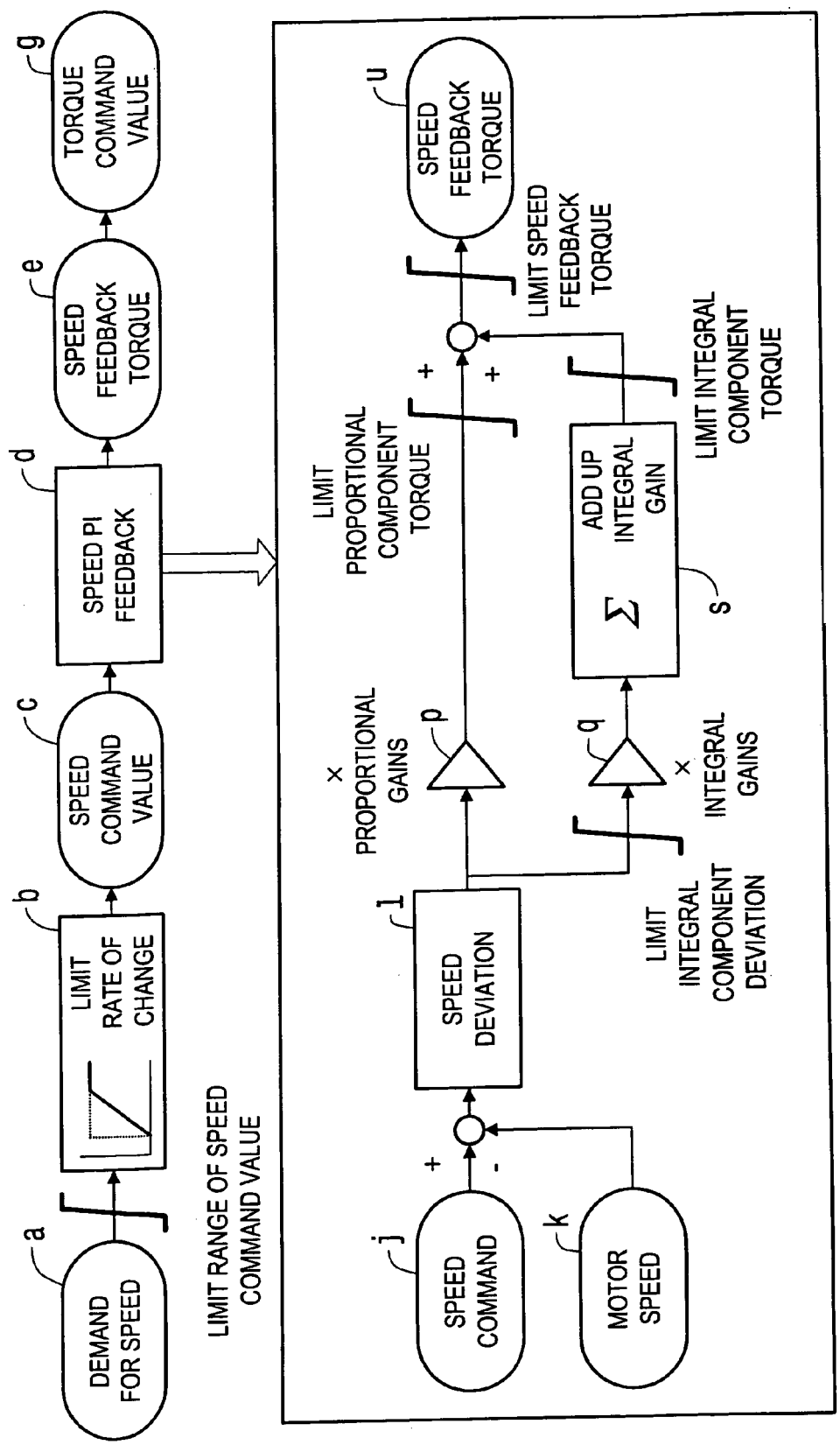
FIG. 6 is a block diagram of a control drive system in the control device.
Figure 7:
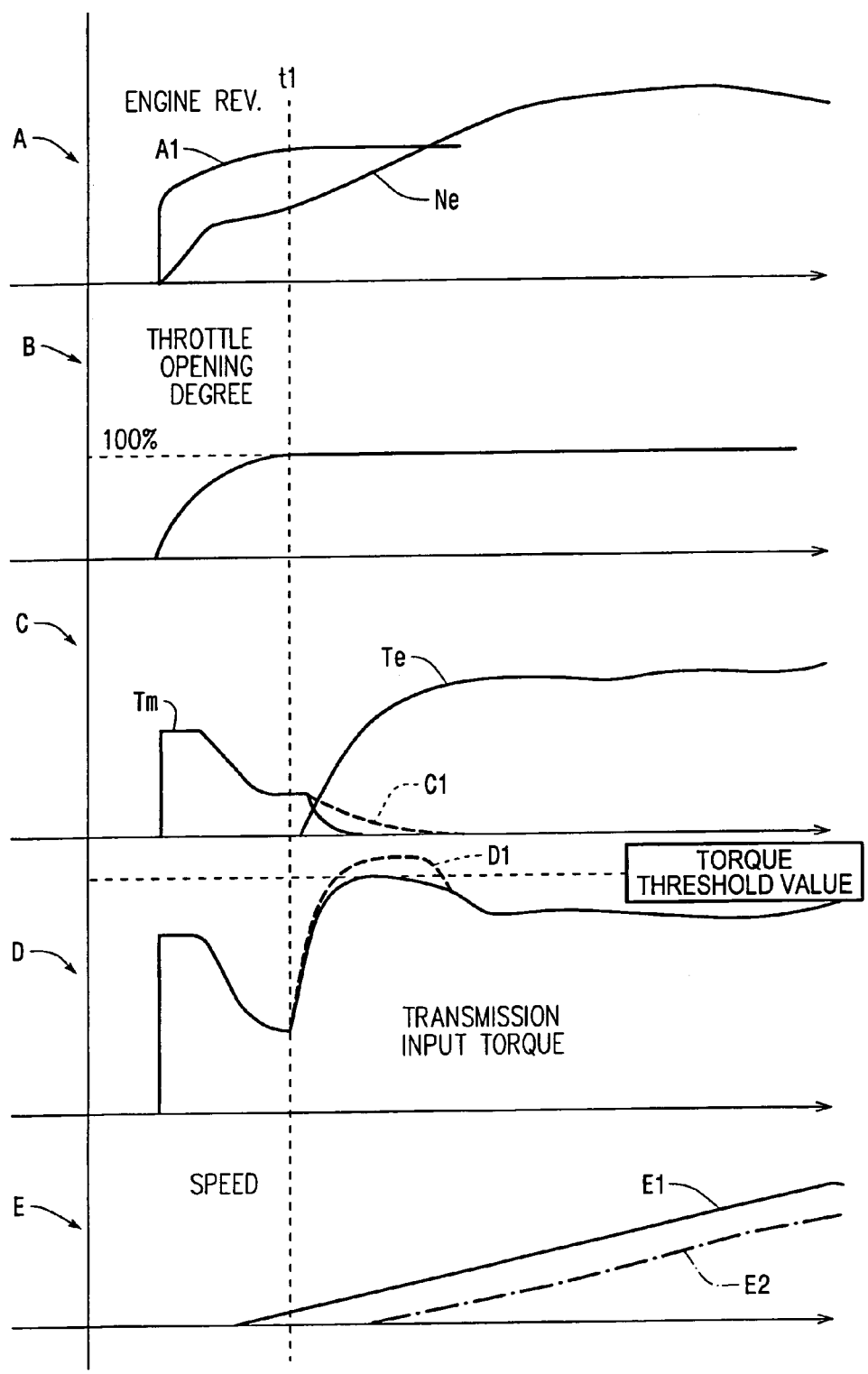
FIG. 7 is a time chart showing an example of a state of control in the control device.
Figure 8:
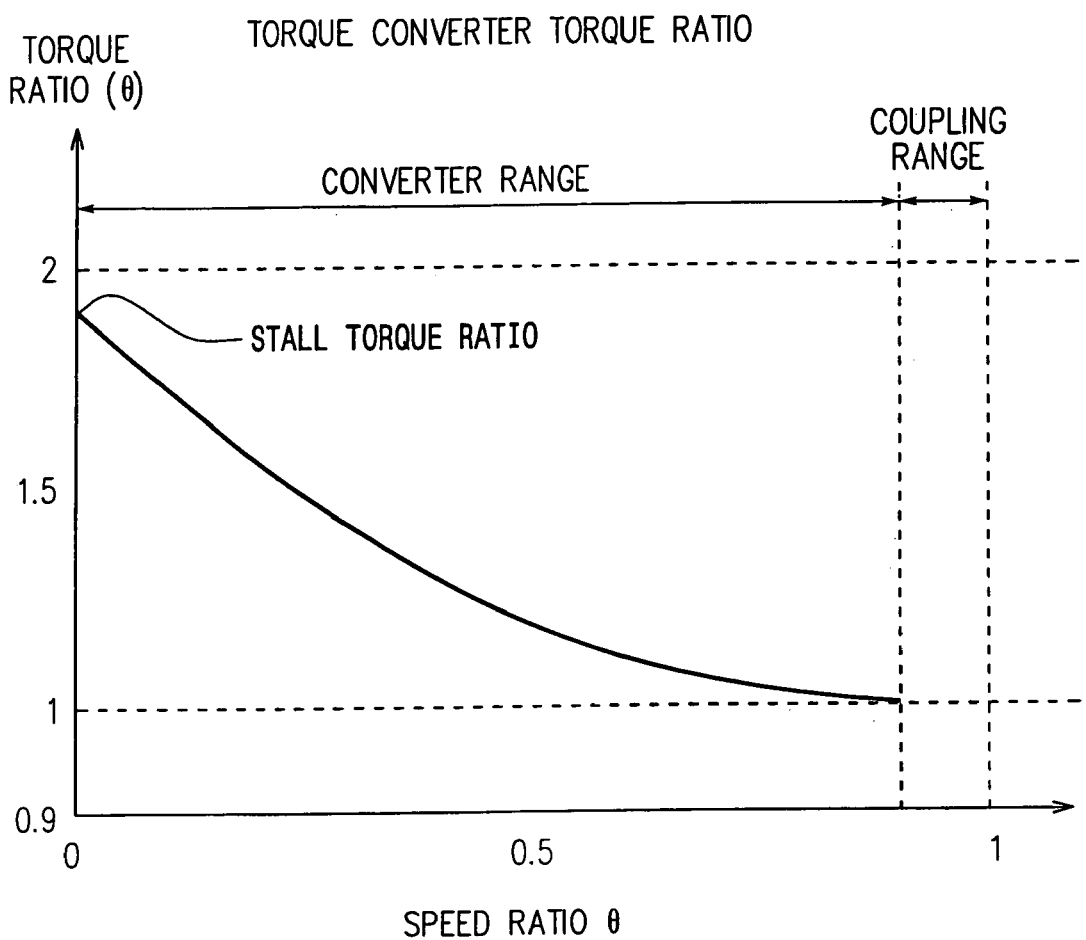
FIG. 8 is a graph illustrating a torque ratio of a torque converter.

Subsequently, an explanation will be given to a control in the control device according to the embodiment with reference to FIGS. 1 and 4–8. FIG. 4 is a flowchart showing a torque limiting control by the control device, FIG. 5 is a view showing table data used in calculating a target rotational speed, FIG. 6 is a block diagram of a control drive system in the control device, FIG. 7 is a time chart showing an example of control in the control device, and FIG. 8 is a graph illustrating a torque ratio of the torque converter 4. In addition, in FIG. 7, A indicates changes in engine rotating speed Ne, B indicates those changes in accelerator opening degree, which are caused by a stepping-on of an accelerator pedal, C indicates changes in motor torque Tm and engine torque Te, D indicates changes in input torque to the input shaft 37 of the automatic transmission mechanism (transmission) 5, and E indicates changes E1, E2 in vehicle speed.

First, when an ignition switch (not shown) is turned ON and the shift lever 23 provided on a driver's seat is manipulated to a running range from a stop state of a vehicle mounting thereon the control device, the motor control means 15 begins control to begin driving the motor 3 according to a stepping-on of an accelerator pedal. Thereafter, the engine control means 14 begins to drive the engine 2 when a predetermined condition is met, and further the motor control means 15 stops driving the motor when a predetermined condition is met. Thereby, the vehicle continues running.

At the time of running, when the accelerator opening degree detection means 21 detects that a driver has released the accelerator pedal, and the brake detection means 22 detects that the brake pedal has been stepped on, the engine control means 14 performs idling stop control to stop an injection in order to stop driving the engine 2, and the motor control means 15 stops the motor 3.

When the vehicle is departed from the stopped state, the engine control means 14 determines the presence and absence of a demand for engine starting in STEP S1 based on a brake pedal being released (a vehicle brake being released) by the brake detection means 22 and of an accelerator opening degree of at least a predetermined value being detected by the accelerator opening degree detection means 21. As a result, when it is determined that a demand for engine starting is made, the processing proceeds to STEP S2 to calculate a target rotational speed $A_1$ in A of FIG. 7. When it is determined that no demand for engine starting is made, the processing in STEP S1 is repeated.

In STEP S2, a target rotational speed $A_1$ is calculated by using table data stored in a memory (not shown) and shown in FIG. 5 and performing linear interpolation of a preset value as the table data. The table stores data for an accelerator opening degree [%] and a target rotational speed [rpm], the target rotational speed is set to 650 [rpm] when an accelerator opening degree is 0 [%], set to 950 [rpm] when an accelerator opening degree is 5 [%], and set to 1200 [rpm] when an accelerator opening degree is 10 [%]. Further, when an accelerator opening degree is 20 [%], and subsequently 40 [%], 50 [%], 60 [%], 70 [%], 80 [%], and 100 [%], the target rotational speed is set to 1150 [rpm].

Subsequently, a motor torque command value in motor speed control is calculated in STEP S3. The motor torque command is calculated from a speed feedback control (PI control) shown in FIG. 6. That is, in the figure, after a command for speed is made (a), a range of a speed command value is restricted and a rate of change is restricted (b), a speed command value is set (c), and a speed PI feedback is executed (d). A speed feedback torque (e) is then obtained and a torque command value (g) is obtained.

In the speed PI feedback (d) shown in FIG. 6, a motor speed (k) is added to a speed command (j). Further, the additional value is multiplied by a speed deviation (l), a×proportional gain (p) is given, and restriction is placed on a proportional component torque (that is, a threshold value is given in order that a proportional component torque does not become a larger torque than needed). Also, restriction is placed on an integral component deviation (that is, a threshold value is given in order to prevent overshoot caused by an integration term due to an excessive deviation of rotating speed), a×integral gain is given (q), the integral gain is added up (s), and restriction is placed on an integral component torque (that is, a threshold value is given in order to prevent overflow of an integration term). Further, a value of the restriction on proportional component torque and a value of the restriction on integral component torque are added together, restriction is placed on speed feedback torque (a threshold value is given in order to prevent the sum of both from becoming a maximum torque or more), and a speed feedback torque is obtained (u).

Subsequently, the torque control means 16 calculates a motor torque limit value (TrqLimMt) in STEP S4. More specifically, the motor torque limit value (TrqLimMt) can be calculated by the use of the following formula TrqLimMt=TrqLimOut/t(e)−TrqEg Here, TrqLimOut indicates the torque limit value that can be input into an A/T gear box of the automatic transmission mechanism 5, and t(e) indicates a torque ratio (see FIG. 8) of the torque converter 4. Also, e is a speed ratio (ATRpm/EgRpm) of a rotating speed (EgRpm) of the crankshaft 2*a* of the engine 2 based on detection results of the engine speed sensor 27 and a rotating speed (ATRpm) of the input shaft 37 of the automatic transmission mechanism 5, and TrqEg is a drive torque (engine torque) of the engine 2 when the motor torque limit value (TrqLimMt) is calculated.

Here, an explanation will be given to a torque ratio of the torque converter 4 and so on with reference to FIG. 8. In a graph shown in the figure, an axis of ordinates indicates a torque ratio t(e) (a ratio, at which torque increases), and an axis of abscissas indicates a speed ratio e (rotating speed of the input shaft 37/rotating speed of the crankshaft 2*a*). In the figure, the smaller the speed ratio e, the larger the torque ratio t(e), and as a difference in rotating speed between the both decreases, the torque ratio t(e) approaches 1. When the speed ratio e is 0, the torque ratio t(e) is maximum, corresponding to a state of departure, in which the turbine runner 4*b* of the torque converter 4 does not rotate but only the pump impeller 4*a* rotates. This point of time corresponds to a stall point, and the torque ratio t(e) becomes maximum. Since this point of time, power is gradually transmitted to the turbine runner 4*b* from a side of the pump impeller 4*a*, so that the turbine runner 4*b* begins to rotate to transmit power to the automatic transmission mechanism 5. At this time, transmission efficiency begins to increase with the gradually increasing speed ratio, and when a difference in rotating speed between the turbine runner 4*b* and the pump impeller 4*a* becomes small, the torque ratio t(e) approaches 1 to lead to a decrease in transmission efficiency. When the stator 4*c* stops, the stator 4*c* then begins to rotate owing to the function of the one-way clutch 4*d* (FIG. 3A which supports the stator 4*c* (clutch point). At speed ratios before this, a torque increasing action is caused (converter range). At a clutch point, the stator 4*c* stops and the torque ratio t(e) becomes 1, but at speed ratios before this point of time, the stator 4*c* begins to rotate in order to avoid the torque ratio t(e) becoming 1 or less (coupling range).

Subsequently, the processing proceeds to STEP S5 to determine whether the motor torque command value calculated in STEP S3 is larger than the motor torque limit value (TrqLimMt) calculated in STEP S4. As a result, when the motor torque command value is larger than the motor torque limit value (TrqLimMt), the processing proceeds to STEP S6, and if not so, the processing jumps to STEP S7.

In STEP S6, the torque control means 16 limits a motor torque command value to the motor torque limit value (TrqLimMt) recognizing that a torque ratio of the torque converter 4 is in a predetermined range, and thereafter the processing proceeds to STEP S7. At this time, when an accelerator opening degree is increased to 100 [%] from 0 according to a stepping-on of an accelerator pedal (B in FIG. 7), a motor torque Tm of the motor 3 beginning a rotational drive at a maximum torque puts the crankshaft 2*a* of the engine 2 directly connected to the motor 3 in a state of rotation accompanying the motor drive as shown in C in FIG. 7.

In STEP S7, it is determined whether conditions of non-ignition of the engine and of engine torque ignition are met. As a result, when these conditions are met, the processing proceeds to STEP S8, and if not so, the processing jumps to STEP S9.

When the engine 2 is ignited (time t1 in FIG. 7), an engine stability judgment timer is set and begins counting in STEP S8. Such an ignition causes an engine rotating speed Ne to gradually increase in order to become a target rotational speed A1 (A in FIG. 7). The engine control means 14 then determines in STEP S9 whether the engine 2 has achieved a state of complete explosion. The state of complete explosion means a state, in which ignition has been completed in all cylinders (not shown) of the engine 2. A method of judging complete explosion can determine a state of complete explosion, for example, in the case where an engine rotating speed is increased to that rotating speed which cannot be reached by only the motor 3, an abrupt change is found in engine rotating speed, a necessary motor torque reaches a certain level or higher in speed control, and the like.

Subsequently, when the engine 2 is put in the state of complete explosion as a result of a judgment in STEP S9, the processing proceeds to STEP S10, and if not so, the processings from STEP S2 on are repeated. And as shown in D of FIG. 7, an engine torque Te is added to a motor torque Tm from a certain point of time from time t1 on in the figure. An input torque into the automatic transmission mechanism 5 is also excessively output as indicated by a dotted line D1. However, at that time the motor control means 15 drivingly controls the motor 3 in response to the motor torque limit value (TrqLimMt), which is calculated by the torque control means 16 in order to reduce a value over the motor torque limit value (TrqLimOut), so that a quantity corresponding to torque C1 in the motor torque Tm in FIG. 7 is not output. Accordingly, an increase in torque caused by the torque converter 4 when a drive torque of the engine 2 is input is cancelled. Therefore, the excessive output as indicated by the dotted line D1 is not output.

The engine control means 14 causes an increment of an engine stability judgment timer (not shown) in STEP S10, and further it is determined in STEP S11 whether the timer exceeds (times up) a predetermined time T1. The engine stability judgment timer is provided to avoid such a disadvantage that an unexpected torque may cause damage on the transmission and give discomfort to a driver while the engine 2 is not stable in operation even after the engine complete explosion. When the timer has timed up as the result of STEP S11, the processing is terminated, and when the timer has not timed up, the processings from STEP S2 on are repeated.

Thus an engine torque Te is gradually increased as shown in C of FIG. 7, and a vehicle speed is correspondingly increased as shown in E1 or E2 in E of FIG. 7 before and after time t1. In addition, E1 indicates changes in running on a flat road with a small inclination, and E2 indicates changes in running on a sloping road with a relatively large inclination.

As described above, according to the embodiment, the torque control means 16 outputs a motor torque command (torque reduction command) in a manner to reduce a drive torque of the motor 3 by a predetermined quantity to cancel a surplus torque quantity caused by a drive torque of the engine 2. This occurs when the engine 2 begins driving after driving of the motor 3 is started and torque is in a predetermined range, in which an excessive torque in generated by the torque increasing action of the torque converter 4. As such, a disadvantage in that a somewhat excessive drive torque is transmitted to drive wheels through the automatic transmission mechanism 5 from the torque converter 4 can be prevented when an engine torque is added to a motor torque at the later time of departure, conjointly with a period of time, in which a vehicle speed is low and the torque increasing action by the torque converter 4 is highly active. Thereby, it is possible to surely prevent a disadvantage that wheelspin or the like is generated, thus enabling protection of the automatic transmission mechanism 5.

Since the torque control means 16 calculates a drive torque (TrqLimMt), which the motor 3 should output in order to cancel a surplus torque quantity, on the basis of a torque limit value (TrqLimOut) allowed to be input into the automatic transmission mechanism 5, a torque ratio (t(e)) of the torque converter 4, a speed ratio (e: ATRpm/EgRpm) of the crankshaft 2a and the input shaft 37, and a drive torque (TrqEg) of the engine 2 at the time of calculation of the drive torque (TrqLimMt), it is possible to exactly reduce a drive torque of the motor 3 by a quantity of an engine torque that is excessively output by the torque increasing action, and to obtain an appropriate drive torque transmitted to a side of drive wheels through the torque converter 4. Thereby, a vehicle can be rapidly departed at the drive torque, which prevents wheelspin, in the normal road surface condition free from, for example, rainwater and snow.

Here, calculation of a motor torque limit value (TrqLimMt) by the torque control means 16 will be described taking a detailed example. While no problem is caused in design even when inertia is neglected, an example taking into account inertia is here referred to in order to enhance correctness.

That is, torque input into the automatic transmission mechanism (A/T) 5 is set to a predetermined value or less in order to avoid damage to the A/T, in which case the relationship among A/T input torque, engine torque, and motor torque is indicated by the following formula (1).

$$T_{A/TIN} = t(e)*(Te+Tm-I_1\omega_e) \qquad (1)$$

From the formula (1), a threshold value TrqLimMt of motor torque Tm is indicated by the following formula (2) where TrqLimOut indicates the torque limit value input into A/T.

$$TrqLimMt = \frac{TrqLimOut}{t(e)} - Te + I_1\dot\omega_e \qquad (2)$$

Here, $I_1$: moment of inertia (inertia) of an engine and a motor, and ωe: angular acceleration of a crankshaft.

As described above, since the torque control means 16 calculates a motor torque limit value TrqLimMt output as a torque reduction command on the basis of a threshold value (TrqLimOut) of torque input into the automatic transmission mechanism 5, torque ratio (t(e)) of the torque converter 4, torque Te of the engine 2, inertia $I_1$ of the engine 2 and the motor 3, and an angular acceleration of the crankshaft (output shaft) 2a of the engine 2, a motor torque limit value TrqLimMt can be appropriately calculated in a vehicle, which starts driving of the engine 2 after driving of the motor 3 is started in a state of an engine stop, to suppress a surplus torque, which is liable to generate via the torque converter 4 when engine torque is output after motor torque is output, and a more correct motor torque limit value TrqLimMt can be obtained by taking into account inertia of the engine 2 and the motor 3.

Figure 9:
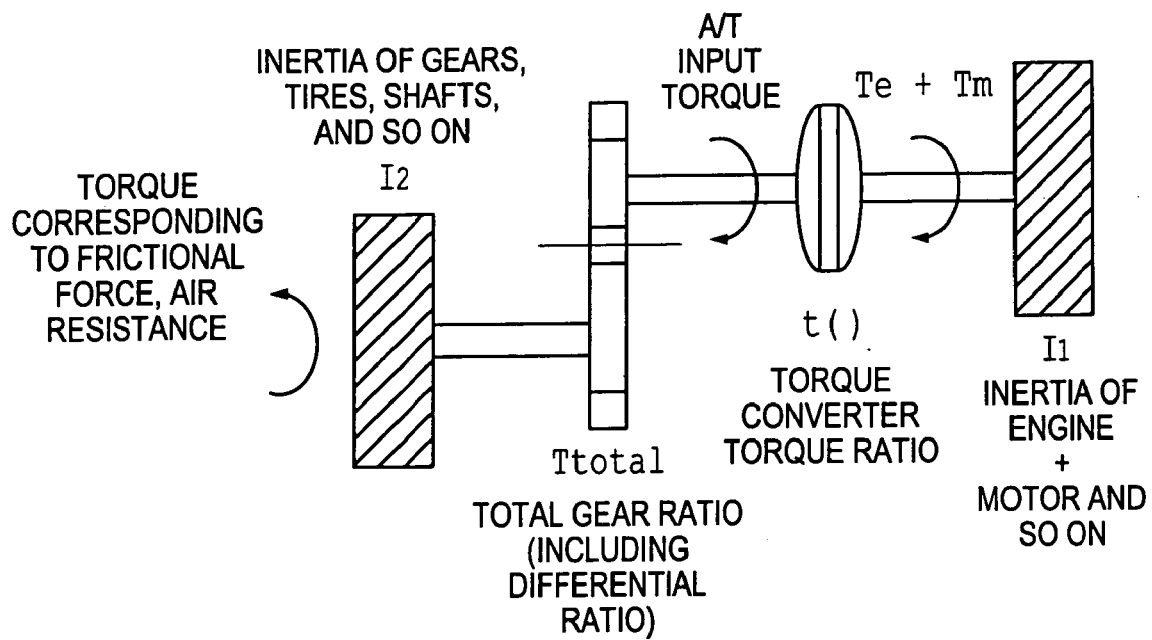
FIG. 9 is a schematic view showing a vehicle model.

Subsequently, calculation of a motor torque limit value (TrqLimMt) by the torque control means 16 will be described taking a separate example (see a vehicle model in FIG. 9). That is, a more detailed formula becomes necessary due to the need of making torque transmitted to axles below a predetermined value in order to avoid wheelspin. The relationship among the differential shafts (left and right axles) 45l, 45r, engine torque, and motor torque is indicated by the following formula (3).

$$Ttotal*t(e)*(Te+Tm-I_1\omega_e) = TrqOut-I_2\omega_w \qquad (3)$$

Also, an upper limit TrqLimOut of TrqOut free from wheelspin is indicated by the following formula (4).

$$TrqLimOut = R*\left(\mu mg + mR\dot\omega_w + \frac{1}{2}Cd\rho AR^2\omega_w^2\right) \qquad (4)$$

And a limiting value TrqLimMt of motor torque Tm is indicated by the following formula (5).

$$TrqLimMt = \frac{1}{Ttotal*t(e)}*$$
$$\left(R*\left(\mu mg + mR\dot\omega_w + \frac{1}{2}Cd\rho AR^2\omega_w^2\right) - Te + I_1\dot\omega_e\right) \qquad (5)$$

Here, $T_{total}$: total gear ratio (including differential ratio), depending upon a gear stage R: tire radius μ: maximum coefficient of static friction between tires and a road surface m: vehicle weight $\omega_w$: axle angular velocity $\dot\omega_w$: axle angular acceleration ρ: density of air Cd: Cd (constant drag) value of vehicle A: projected area of vehicle front surface $I_2$: moment of inertia (inertia) of tire, gears, and so on, depending upon a gear stage

* μmg indicates a maximum frictional force between road surface and tire

* (½)CdρAv₂ (=(½)CdρAR²$\omega_w^2$) represents air resistance (proportional to the square of vehicle speed)

* for the sake of simplicity, the formula does not take account of a gradient of road and distribution of overload on front and rear wheels.

As described above, since the torque control means 16 calculates a motor torque limit value TrqLimMt output as a torque reduction command on the basis of at least a total gear ratio $T_{total}$ including a final reduction ratio, a radius R of tires provided on a vehicle, a maximum coefficient μ of static friction between the tires and a road surface, a weight m of the vehicle, an angular velocity (ωw) of the differential shafts (left and right axles) 45l, 45r, an angular acceleration of the shafts 45l, 45r, a density of air (ρ), a cd value (that is, an air resistance coefficient) of the vehicle, and a projected area A of vehicle front surface, a motor torque limit value can be appropriately calculated in a vehicle, which runs starting driving of the engine 2 after driving of the motor 3 is started in a state of engine stop, to suppress a surplus torque, which is liable to generate via the torque converter 4 when an engine torque is output after a motor torque is output, and a more correct motor torque limit value suited for avoidance of wheelspin can be obtained through taking account of torque to the differential shafts 45l, 45r. Also, since the torque control means 16 further calculates a motor torque limit value TrqLimMt taking into account inertia $I_2$ of tires of the vehicle, gears, and so on, a more correct motor torque limit value TrqLimMt is obtained.

According to another aspect of the invention, since the torque control means calculates a drive torque, which the motor should output in order to cancel a surplus torque quantity, on the basis of a torque limit value, a torque ratio of the torque converter, a speed ratio of the output shaft of the engine and the input shaft of the transmission, and a drive torque of the engine, it is possible to exactly reduce a motor torque by a quantity of an engine torque that is excessively output by the torque increasing action, and to obtain an appropriate drive torque that should be transmitted to a side of drive wheels through the torque converter. Thereby, for example, in the normal road surface condition free from rainwater and snow, a vehicle can be rapidly departed at the drive torque which prevents wheelspin.

According to another aspect of the invention, since the torque control means calculates a motor torque limit value on the basis of at least the torque limit value input into the transmission, a torque ratio of the torque converter, torque of the engine, inertia of the engine and the motor, and an angular acceleration of the output shaft of the engine, a motor torque limit value can be appropriately calculated in a vehicle, which runs starting driving of the engine after driving of the motor is started in a state of engine stop, to suppress a surplus torque, which is liable to generate via the torque converter when engine torque is output after motor torque is output, and a more correct motor torque limit value can be obtained through taking account of inertia of the engine and the motor.

According to another aspect of the invention, since the torque control means calculates a motor torque limit value on the basis of at least a total gear ratio including a final reduction ratio, a radius of tires, a maximum coefficient of static friction between the tires and a road surface, a weight of the vehicle, an axle angular velocity, an axle angular acceleration, a density of air, a cd value of the vehicle, and a projected area of a vehicle front surface, a motor torque limit value can be appropriately calculated in a vehicle, that starts driving the engine after a driving of the motor is started, to suppress a surplus torque, which is liable to generate via the torque converter when an engine torque is output after a motor torque is output, and a more correct motor torque limit value suited for avoidance of wheelspin can be obtained through taking account of torque to the axles.

According to another aspect of the invention, since the torque control means further calculates a motor torque limit value taking into account inertia of tires of the vehicle, gears, and so on, a more correct motor torque limit value can be obtained.

According to another aspect of the invention, the torque control means performs speed control of the motor, thereby rapidly carrying out inhibitory control of a surplus torque, which is liable to generate via the torque converter.

The invention is not limited to the aforementioned embodiments, and various modifications based on the purpose of the invention are possible, which are regarded as within the scope of the invention.

What is claimed is:

1. A control device for a vehicle, comprising
    a motor;
    an engine, wherein the motor can be drivingly connected with the engine;
    a torque converter;
    a transmission mechanism for transmitting the drive torque, which is transmitted via the torque converter from the engine and the motor, to drive wheels, and
    a controller that:
        controls a driving state of the motor,
        controls a driving state of the engine, and
        outputs a torque reduction command for controlling a drive torque of the motor in order to place the drive torque of the motor within a maximum input torque of the transmission mechanism, wherein the maximum input torque is calculated based on a torque ratio of the torque converter when the engine begins driving after the motor begins driving.

2. The control device for the vehicle according to claim 1, wherein the controller calculates the drive torque that the motor should output in order to cancel a surplus torque quantity based on a torque limit value allowed to be input into the transmission mechanism, a torque ratio of the torque converter, a speed ratio of an output shaft of the engine and an input shaft of the transmission mechanism, and the drive torque of the engine.

3. The control device for the vehicle according to claim 2, wherein the controller calculates a motor torque limit value output as the torque reduction command based on at least the torque limit value input into the transmission mechanism, the torque ratio of the torque converter, the drive torque of the engine, inertia of the engine and the motor, and an angular acceleration of the output shaft of the engine.

4. The control device for the vehicle according to claim 3, wherein the controller performs speed control of the motor.

5. The control device for the vehicle according to claim 2, wherein the controller calculates a motor torque limit value output as the torque reduction command based on at least a total gear ratio including a final reduction ratio, a radius of tires provided on the vehicle, a maximum coefficient of static friction between the tires and a road surface, a weight of the vehicle, an angular velocity of axles of the vehicle, an angular acceleration of the axles, a density of air, a constant drag value of the vehicle, and a projected area of a front surface of the vehicle.

6. The control device for the vehicle according to claim 5, wherein the controller further calculates the motor torque limit value taking into account an inertia of the tires of the vehicle and gears.

7. The control device for the vehicle according to claim 6, wherein the controller performs speed control of the motor.

8. The control device for the vehicle according to claim 5, wherein the controller performs speed control of the motor.

9. The control device for the vehicle according to claim 2, wherein the controller performs speed control of the motor.

10. The control device for the vehicle according to claim 1, wherein the controller calculates a motor torque limit value output as the torque reduction command on the basis of at least a torque limit value input into the transmission mechanism, the torque ratio of the torque converter, a torque of the engine, inertia of the engine and the motor, and an angular acceleration of an output shaft of the engine.

11. The control device for the vehicle according to claim 10, wherein the controller performs speed control of the motor.

12. The control device for the vehicle according to claim 1, wherein the controller calculates a motor torque limit value output as the torque reduction command on the basis of at least a total gear ratio including a final reduction ratio, a radius of tires provided on the vehicle, a maximum coefficient of static friction between the tires and a road surface, a weight of the vehicle, an angular velocity of axles of the vehicle, an angular acceleration of the axles, a density of air, a constant drag value of the vehicle, and a projected area of a front surface of the vehicle.

13. The control device for the vehicle according to claim 12, wherein the controller further calculates the motor torque limit value taking into account an inertia of the tires of the vehicle and gears.

14. The control device for the vehicle according to claim 13, wherein the controller performs speed control of the motor.

15. The control device for the vehicle according to claim 12, wherein the controller performs speed control of the motor.

16. The control device for the vehicle according to claim 1, wherein the controller performs speed control of the motor.

17. A method of controlling a vehicle with a motor, an engine, wherein the motor can be drivingly connected with the engine, a torque converter and a transmission mechanism for transmitting the drive torque, which is transmitted via the torque converter from the engine and the motor, to drive wheels, comprising:
  controlling a driving state of the motor;
  controlling a driving state of the engine; and
  outputting a torque reduction command for controlling a drive torque of the motor in order to place the drive torque of the motor within a maximum input torque of the transmission mechanism, wherein the maximum input torque is calculated based on a torque ratio of the torque converter when the engine begins driving after the motor begins driving.

18. The method of claim 17, wherein the drive torque that the motor should output in order to cancel a surplus torque quantity is calculated based on a torque limit value allowed to be input into the transmission mechanism, a torque ratio of the torque converter, a speed ratio of an output shaft of the engine and an input shaft of the transmission mechanism, and a drive torque of the engine.

19. The method of claim 17, wherein a motor torque limit value output as the torque reduction command is calculated on the basis of at least a torque limit value input into the transmission mechanism, the torque ratio of the torque converter, a torque of the engine, inertia of the engine and the motor, and an angular acceleration of an output shaft of the engine.

20. The method of claim 17, wherein a motor torque limit value output as the torque reduction command is calculated on the basis of at least a total gear ratio including a final reduction ratio, a radius of tires provided on a vehicle, the maximum coefficient of static friction between tires and a road surface, a weight of the vehicle, an angular velocity of axles of the vehicle, an angular acceleration of axles, a density of air, a constant drag value of the vehicle, and a projected area of a front surface of the vehicle.

* * * * *